July 28, 1959 O. W. SCHALM ET AL 2,896,573
MILKING MACHINE AND TEAT CUP ASSEMBLY THEREFOR
Filed May 14, 1957 3 Sheets-Sheet 1

INVENTORS
OSCAR W. SCHALM
DANIEL O. NOORLANDER
BY
ATTORNEYS

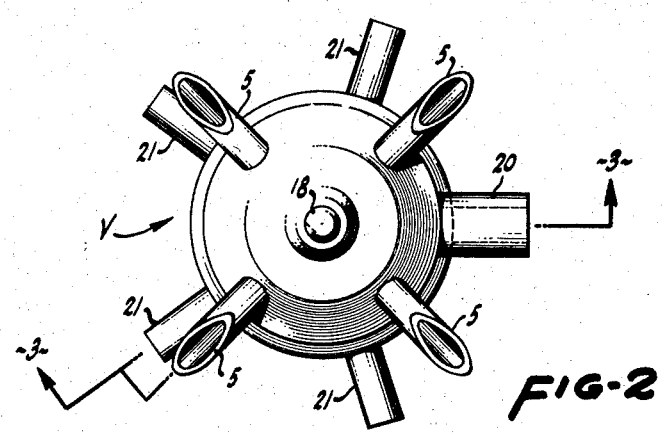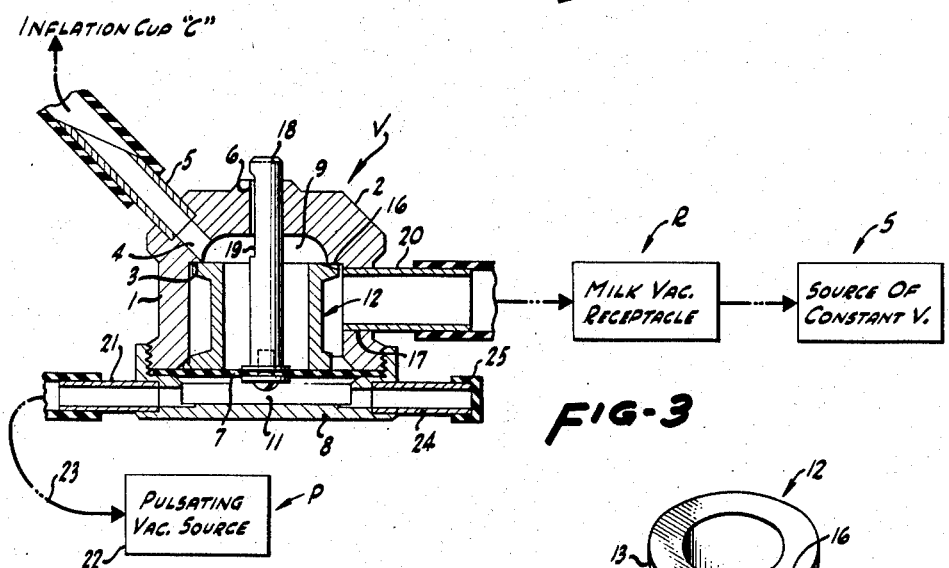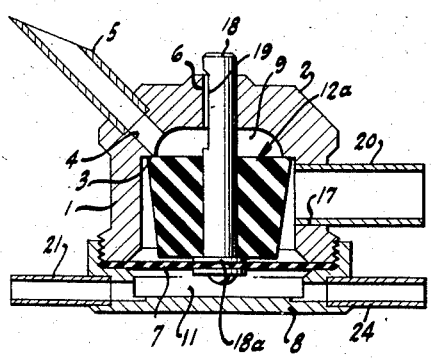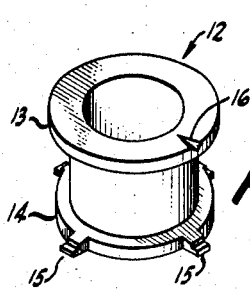

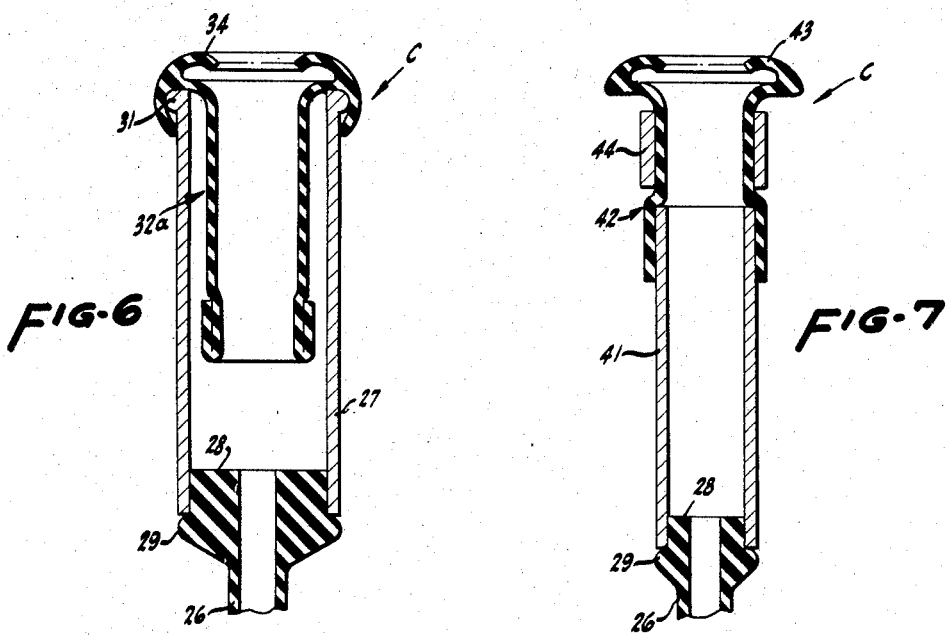
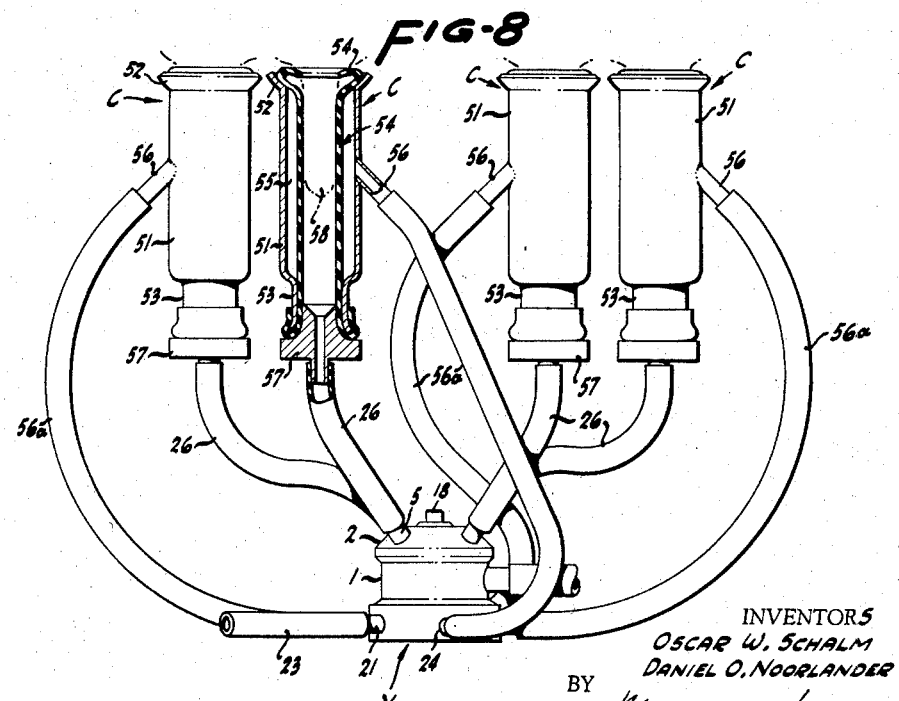

United States Patent Office 2,896,573
Patented July 28, 1959

2,896,573

MILKING MACHINE AND TEAT CUP ASSEMBLY THEREFOR

Oscar W. Schalm and Daniel O. Noorlander, Davis, Calif., assignors to The Regents of The University of California, Berkeley, Calif.

Application May 14, 1957, Serial No. 659,020

9 Claims. (Cl. 119—14.36)

This invention relates to and in general has for its object the provision of a milking machine and a teat cup assembly therefor.

Mechanical milkers are designed and used today have a number of features that may lead to tissue damage as well as to the spread of mastitis bacteria. Teat cups that are large permit vacuum to be applied to the entire teat, and this results in crawling of the cup at the end of milking which in turn leads to the rubbing of tissue against tissue internally in the teat, and at the same time vacuum enters the teat cavity. Conventional milking machines depend on rubber inflations to collapse against the teat with each pulsation to counteract the drawing effect of the vacuum on the blood and tissue fluid of the teat. The large rubber liners, that is, those with a large space for receiving the teat have the effect of forceful slapping of the tip of the teat with each pulsation; this could well be a major factor in weakening the sphincter muscle, and as a result the teat opening may become more susceptible to invasion by bacteria capable of causing mastitis. After the milk leaves the teat, air is required to push the milk into the milk hose. Milking machines that depend on leakage of air into the system from around the top of the teat cup and are of the type that crawl at the end of milking are incapable of moving the milk at the end of milking due to the development of a vacuum-lock in the teat cup. When the cup has crawled, air leakage around the top of the teat cup is prevented and a higher vacuum develops in the teat cup than is present in the milk hose. As a result, with each pulsation, milk is regurgitated from the hose back up into the teat cups. This leads to a bathing of the teats with milk that has been contaminated with bacteria that are present in the milk hose, and in addition, the bathing of the teats leads to a washing of the organic material from the surface of the teats into the milk. This bathing effect definitely contributes to the spread of mastitis organisms in the herd and a contamination of the milk with filth from the external surface of the teats.

The average productive life of a hand milked cow is better than twelve years whereas the average life of a machine milked cow is only three years.

Mastitis has become so rampant in dairy herds, despite a decade of availability and use of wonder drugs and antibiotics, that it is obvious that something very fundamental in dairy herd operation must be a major contributing factor. The milking machine is misused in that many milkers try to operate more units than it is physically possible to attend without leaving the units on too long; also, the rubber teat cup liners are often retained long beyond their ability to respond to the pulsator. The modern milking machine does not permit direct observation of the flow of milk from each individual teat; this is an important contributing factor to leaving machines on too long. Milkers attempt to ascertain the end of milking by squeezing the milk tube of each teat cup between the thumb and index finger. This tends to increase the vacuum in the teat cup, and, if the machine is one that develops a vacuum-lock at the end of milking, a false sense of milking results because of the back and forth movement of milk between the milk hose and the teat cup, as described above.

More specifically, the object of this invention is the provision of a milking machine including a claw and an inflation assembly wherein milking is effected under the influence of a pulsating vacuum within the limits of about 3″ and 15″ of mercury and wherein only the tip of the teat is subject to such a pulsating vacuum. The 3″ lower limit is essential to retain the claw on the teat and the upper limit of 15″ has been found to have no deleterious effect on the teat under the conditions under which it is used.

A further object of this invention is the provision of a teat cup or inflation assembly which insulates all but the tip of the teat against the pulsating vacuum.

Still another object of the invention is the provision of a teat cup or inflation assembly provided with a transparent portion or window through which the progress of the milking operation can be observed, thereby to enable an operator to disconnect the inflation assembly at the end point of the milking operation.

Another object of the invention is the provision of a simple claw or valve mechanism for producing the required pulsating vacuum on the inflation assembly and for delivering the milk to a milk receptacle.

Still, more specifically, the object of this invention is the provision of a milking machine comprising a claw or valve assembly including a valve chamber and a pulsating vacuum chamber separated by a common diaphragm, the valve chamber being provided with four milk inlet ports, a milk discharge port and an air bleed port and the pulsating vacuum chamber being provided with a pulsating vacuum inlet port, and with four milking cup vacuum ports; a valve closure member for simultaneously closing milking inlet port and opening the air bleed port and for alternately opening said milk inlet ports and closing said air bleed port, a milking cup or shell connected to each of the four milk inlet ports of the valve chamber and an inflation or resilient teat receiving sleeve disposed within said cup or shell and so arranged that the pulsating vacuum to which the shell is subjected acts only on the tip of the teat.

Another object of the invention is the provision of an inflation assembly communicating at its lower end with a claw assembly through a transparent plug serving as a lens through which the flow of milk can be observed from any angle with considerable magnification.

The invention possesses other advantageous features, some of which, with the foregoing, will be set forth at length in the following description where those forms of the invention which have been selected for illustration in the drawings accompanying and forming a part of the present specification, are outlined in full. In said drawings, various forms of the invention are shown, but it is to be understood that it is not limited to such forms, since the invention as set forth in the claims may be embodied in other forms.

Referring to the drawings:

Fig. 2 is a top plan view of the claw assembly illustrated in Fig. 1.

Fig. 3 is a vertical section of the claw assembly taken on the offset section line 3—3 of Fig. 2 and diagrammatically illustrating its associated pulsating vacuum source, vacuum milk receptacle and source of constant vacuum.

Fig. 4 is a perspective view of the valve closure member forming a part of the claw assembly illustrated in Figs. 2 and 3.

Fig. 5 is a vertical midsection of a claw assembly identical with that shown in Figs. 2 and 3 with the exception that a modified form of valve closure member has been resorted to.

Fig. 6 is a vertical midsection taken through a modification of the inflation assembly illustrated in Fig. 1.

Fig. 7 is a vertical midsection of still another form of inflation assembly.

Fig. 8 is a side elevation of a milking machine similar to that illustrated in Fig. 1 but wherein a further modified inflation assembly has been resorted to.

General assembly

Figure 1:
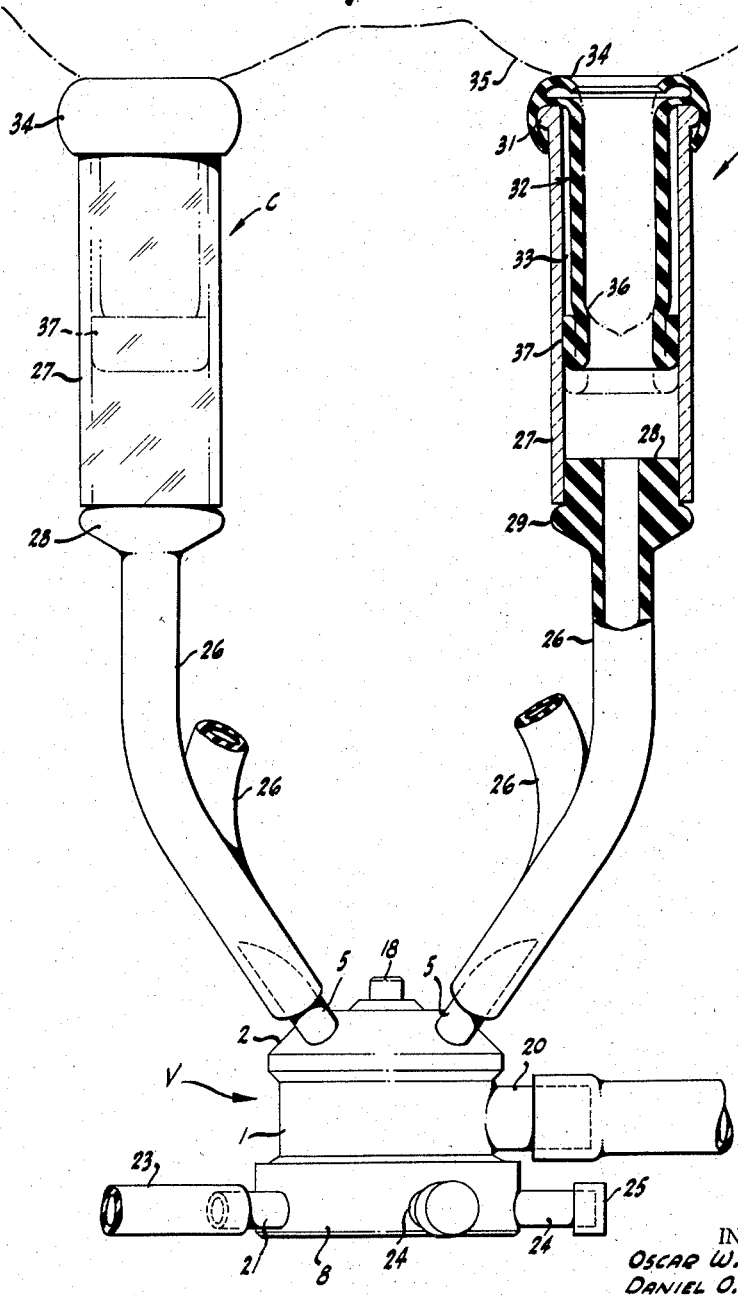
Fig. 1 is a side elevation of a milking machine embodying the objects of our invention and including a claw assembly and milk cup inflation assemblies, portions thereof being broken away to better illustrate this construction.

As illustrated in Figs. 1 and 3, the objects of our invention have been embodied in a milking machine including a claw or vacuum control valve V connected to four inflation cup assemblies C and associated with a pulsating vacuum source P (Fig. 3), a milk vacuum receptacle R and a source S of constant vacuum.

Claw assembly

The claw assembly illustrated in Figs. 1, 2, 3 and 4 includes a body 1 of inverted cup shape closed at its upper end by a top wall 2 and formed with an internal annular shoulder 3. Formed in the top wall 2 are four symmetrically arranged inclined milk inlet ports 4 and fixed to the wall 2 in communication with each of these ports is a hose nipple 5. Also formed in the wall 2 is an axially extending air bleed port 6 of circular cross section.

Extending across the lower open end of the valve body 1 is a flexible rubber diaphragm 7, this diaphragm being held in sealed relation to the valve body by a circular cap 8 threaded over the lower end thereof. As a result of this construction, it will be seen that the diaphragm 7 divides the claw assembly into an upper valve chamber 9 and into a lower pulsating vacuum chamber 11.

Seated on the diaphragm 7 is spool shaped valve operator 12 provided with top and bottom flanges 13 and 14. Formed integral with the lower flange 14 are four symmetrically arranged, radially extending, stepped orienting lugs 15. As best shown in Fig. 3, the lugs 15 are receivable beneath the lower internally undercut ends of the valve body side walls. Since the outer ends of the lugs 15 lie on a circle of greater diameter than the inner diameter of the valve body, the valve closure member 12 can be inserted into the valve body only with its upper flange 13 adjacent its upper end. This is of importance for the upper flange 13 is provided with a milk bleed channel or notch 16 arranged to permanently establish communication between the ports 4 and a milk port 17 formed in side wall of the valve body 1.

Secured to the diaphragm 7 coaxially therewith is a valve closure pin 18 extending through the port 6 and provided with a flat 19 intermediate its ends and normally straddling the port 6. As a result of this construction, the wall of the port 6 and the flat 19 together define an air bleed port or passageway for establishing communication between the valve chamber 9 and atmosphere when the diaphragm 7 is in its elevated position. Here it should be noted that at this point in the cycle of operation the upper face of the valve closure member 12 is seated against the internal valve body shoulder 3 and with the diaphragm serves in effect to close the milk inlet ports 4. In other words, at this point communication between the ports 4 and the milk discharge port 17 has been cut off except through the channel or notch 16 formed in the upper face of the valve closure member 12. Simultaneously, ambient air passes into the chamber 9 through the open port 6 for establishing the differential pressure required for evacuating the milk content of the chamber 9 through the milk discharge port 17.

Secured to the cap 8 in communication with the chamber 11 is a nipple 21 and connected thereto and a source 22 of pulsating vacuum is a section of hose 23. The pulsating vacuum source 22 can be of any conventional construction such as commonly used with equipment of this character and, per se, is not a part of this invention.

Also secured to the cap 8 in communication with chamber 11 are four vacuum nipples 24, each closed with a readily removable cap or stopper 25 as shown in Figs. 1 and 4.

Secured to port 17 or forming a part thereof is a nipple 20 and connected in series therewith is the receptacle R and the source S of constant vacuum.

Inflation assembly

Communicating with each of the four nipples 5 (Fig. 1) through a flexible hose section 26, is a transparent plastic cylinder or shell 27 and for this purpose the upper end of each section terminates in a plug 28 having a friction fit with its associated shell 27 and is provided with a bead 29. Formed on the upper end of the shell 27 is an annular bead or flange 31 and stretched over this flange is the upper end of a rubber teat sleeve 32 depending into the shell 27 with substantial clearance so as to form an annular air chamber 33 therewith. Formed integrally with the upper end of the sleeve 32 is a rounded inwardly extending annular cushion 34 arranged to seat against the udder 35 of a cow with one of its teats 36 snugly accommodated within the confines of the sleeve 32.

The lower end of the sleeve 32 can conveniently be bent over itself, thereby to form an annular piston 37 having an airtight but running or sliding fit with the shell 27 and serving to close off the lower end of the annular air chamber 33.

Operation

In the operation of the milking machine as above described, the inflation assemblies are attached to the teats of a cow with the weight of their associated claw assembly carried thereby, all as shown in Fig. 1, and with the claw assembly attached to its associated pulsating vacuum source P, milk container or receptacle R and source of constant vacuum S, the members R and S also being of conventional and well known construction. The vacuum source S is here arranged to pull a substantially constant vacuum in the order of 15" of mercury and the pulsating source of vacuum being arranged to operate between 15" and 0" of mercury at a cycle in the order of 45 to 50 pulsations per minute. Here it should be observed that under these conditions the size of the air bleed port 6 is such that when open it will reduce the residual vacuum within the inflations only to about 3" of mercury rather than to 0" of mercury. In other words, the upper end of the pin 18 will close the bleed port 6 at about the time that the vacuum at the milk inlet ports has arrived at 3" of mercury.

Also here it should be noted that just prior to applying the inflation assemblies to a cow, the cow's teats have been massaged and a few streams of milk removed by hand, so as to stimulate her to let down her milk.

Now assuming that the milking machine has been placed in operation as above indicated, it will be observed that as the vacuum within the chamber increases (pressure drop), the diaphragm 7 will move downwardly and with it the valve closure member 12 and the pin 18. This action establishes communication between the milk inlet ports 4 and the milk discharge port 17 around the upper end of the valve closure member 12. Simultaneously, the upper end of the pin 18 closes the air bleed port 6. Under these conditions, the lower end of each of the inflation shells 27 will be subjected to a vacuum in the order of 15" of mercury. Since the annular chamber 33 is atmosphere under atmospheric pressure, the resulting differential pressure between the chamber 33 and the exterior or lower side of the annular piston 37 will cause the piston 37 to slide downwardly to its extended dash line position, as shown in Fig. 1. As the rubber inflation or teat sleeve 32 is stretched downwardly, its diameter will be correspondingly diminished and, as a result, the teat 36 will be subjected to a slight squeeze substantially throughout its entire length. Simultaneously, the tip of the teat is under the influence of 15" of mercury and the action plus the hydrostatic head of the milk within the teat and the udder and the inherent action of the cow in trying to release her milk forces the milk through the teat, and the hose section 26 into the valve chamber 9 and through this chamber into the milk receptacle R. Here it should be particularly noted that only the tip of the teat is directly subjected to the action of vacuum and that the teat is squeezed only as a result of the stretching of the teat sleeve.

During the reverse cycle of operation, the pressure within the chamber 11 rises and with it the valve closure member 12 and the pin 18. As a result of this, the ports 4 are effectively closed and the air bleed port 19 is opened. Air bleeding into the valve chamber 9 through the port 19 serves to decrease the residual vacuum within the inflation shells 27 but only to 3" of mercury for by that time the positions of the valves are reversed. When the valve closure member 12 is in closed position, milk within the chamber 9 continues to flow into the nipple 20 through the bleed notch or channel 16 as a result of the air entering through the port 6 and the constant vacuum of 15" of mercury maintained in the tank R.

Modified valve closure member

As illustrated in Fig. 5, a tapered rubber plug 12a can be substituted for the spool shaped valve closure member, this plug having a friction fit with the pin 18. Here the lower end of the plug 12a should be positively spaced from the diaphragm 7 by a spacing washer 18a. The operation of this modified structure is identical to that of the claw illustrated in Fig. 3 with the exception that since the plug 12a when in its upper closed position still allows of some leakage around the valve body shoulder 3, the channel or notch 16 utilized in connection with the valve closure member 12 can be dispensed with.

Modified inflation of Fig. 6

The inflation assembly illustrated in Fig. 6 is identical with those shown in Fig. 1 with the single exception that the diameter of the teat sleeve 32a is sufficiently smaller in relation to the diameter of the shell 27 to preclude any piston action on the part of the lower overturned end of the teat sleeve 32a. However, here just as in the case of the teat sleeves 32 shown in Fig. 1, the diameter of the lower end of the sleeve is reduced as a result of its overturn. In both cases, this serves to seal the lower end of the teat within the sleeve so that only the tip of the teat is subjected to the vacuum imposed on the shell. In the operation of this type of inflation, the entire outer surface of the sleeve 32a is subjected to vacuum as well as the tip of the teat and the sleeve is more free to balloon during the milk discharge period of the cycle.

Modified inflation of Fig. 7

The modified inflation assembly disclosed in Fig. 7 includes a transparent plastic shell 41 arranged at its lower end to be connected through the plug 28 and hose section 26 with a claw assembly such as illustrated in Figs. 1, 3 or 5. Stretched over the upper end of the shell 41 is a rubber sleeve 42 having a normal inner diameter substantially equal to the inner diameter of the shell 41 and terminating at its upper end in an overturned, annular teat receiving orifice and cushion 43. Surrounding the sleeve 42 immediately above the upper end of the shell 41 is a metal confining ring or band 44 serving to restrain the lower end of a teat 45 accommodated therein from ballooning during the milk discharge period. Here only the lower end of the teat is disposed within the inflation and it is only the tip of the teat that is subjected to the influence of the pulsating vacuum.

Modified milking machine of Fig. 8

The modified milking machine assembly disclosed in Fig. 8 includes four modified inflation assemblies, each comprising a cylindrical metal shell 51 provided with an outwardly flared or dished upper end 52 and a lower end 53 of reduced diameter. Seated on the dished upper end 52 is the upper overturned end 54 of a rubber teat sleeve or inflation 54 extending through the shell 51 and stretched over and around the lower end 53 thereof. Secured to the side wall of the shell in communication with the annular chamber 54 defined by the shell and the teat sleeve is a nipple 56. Closing the lower end of the inflation assembly is a stepped, transparent plastic plug 57 arranged to be connected with one of the nipples 5 of a claw assembly or valve V through one of the flexible hose sections 26. The claw assembly V is identical to the claw assembly V previously described with reference to Figs. 1 and 3 although here the nipples 24, instead of being closed by the caps 25 as shown in Fig. 3, are connected to nipples 56 through hose sections 56a.

In the operation of this modification, the interior of the teat sleeve 54, as well as the annular chamber 55, is simultaneously subjected to the pulsating vacuum produced by the vacuum pulsator P. As in the case of all of the other inflation assemblies, it is only the tip of the teat 58 which is under the direct influence of the pulsating vacuum. Here, although the inflation assembly shell is not transparent, the flow of milk through the inflation can be observed through the plastic plug 57 which, due to the refraction of light through it, not only magnifies the stream of milk but also enables such stream to be viewed from any angle. This feature is of considerable convenience for it dispenses with the necessity on the part of the operator of bending down so as to be in line with inflation assembly when making an observation.

In all of the modifications above described, the pulsating vacuum is only applied to the tip of the teat and the vacuum is constrained to fluctuate between 3" and 15" of mercury. Since only the tip of the teat is subjected to vacuum, discomfort to the cow associated with vacuum is reduced. By limiting the diameter of the inflation to a narrow bore, the tendency for the teat cup to crawl and the ballooning of the teat is reduced. By reducing the vacuum to 3–5 inches of mercury within the inflation with each pulsation, the amount of pressure exerted on the teat is proportionately reduced. As a result of these various expedients, damage to the teat sphincter muscle is avoided, and, as a result thereof, it can continue to retain the teat milk orifice normally closed and thus avoid the ingress of mastitis bacteria. Also, as a result of these expedients, excessive kneading of the teat and udder tissues is avoided, with the result that the formation of lesions through which bacteria could gain access to the circulatory system of the cow is avoided.

The provision in the inflation assembly of a window makes it possible for the operator to visually determine when a cow has dropped all of her milk so that he can promptly remove the inflations and relieve the cow of pulsating action of the milking machine.

We claim:

1. A milking machine comprising: a valve chamber provided with four milk intake ports, a milk discharge port and an air bleed port; an inflation assembly connected with each of said milk intake ports through a flexible hose; a closed milk container communicating with said milk discharge port; and a valve closure member disposed within said chamber for closing each of said milk intake ports and opening said air bleed port simultaneously and for alternately opening said milk intake ports and closing said air bleed port simultaneously, said valve closure member thereby operating alternately to open or close said intake and discharge ports.

2. A milking machine as defined in claim 1 provided with a permanently open bleed passageway between said milk inlet ports and said milk discharge port.

3. A milking machine as defined in claim 1 wherein each of said inflation assemblies comprises a transparent cylindrical shell closed at its lower end and communicating at said end with one of said flexible hoses; and a flexible teat receiving sleeve depending into said shell and sealed at its upper end to the upper end of said shell, said sleeve being arranged to snugly accommodate a cow teat.

4. A milking machine claw comprising: a valve chamber closed on one side by a diaphragm and provided with four milk inlet ports, a milk discharge port and an air bleed inlet port; a valve closure member seated on said diaphragm for opening said milk inlet ports and closing said air bleed inlet port simultaneously and for alternately closing said milk inlet ports and opening said air bleed inlet port simultaneously; and means for periodically raising and lowering said diaphragm, thereby to actuate said valve closure member.

5. A milking machine claw comprising: a valve chamber closed on one side by a diaphragm and provided with four milk inlet ports, a milk discharge port and an air bleed inlet port; a valve closure member seated on said diaphragm within said valve chamber for opening said milk inlet ports and closing said air bleed inlet port simultaneously and for alternately closing said milk inlet ports and opening said air bleed inlet port simultaneously; and an air chamber sealed over said diaphragm on the side thereof opposite said valve chamber and provided with a port for connecting said air chamber with a source of pulsating air.

6. A milking machine claw as defined in claim 5 wherein said air chamber is provided with four additional ports for connecting said air chamber with four teat inflations.

7. A milking machine claw comprising: a closed valve chamber and a closed air chamber separated and sealed to a common diaphragm, said valve chamber being provided with four milk inlet ports, a milk discharge port and an air bleed port and said air chamber being provided with four inflation ports and a vacuum port; a spool shaped valve closure member seated on said diaphragm within said valve chamber and arranged to open said milk inlet ports simultaneously and alternately to close said milk inlet ports simultaneously; and an upstanding air bleed port closure pin secured to said diaphragm coaxially with said spool shaped valve closure member and arranged to alternately close and open said air bleed port simultaneously with the opening and closing of said milk inlet ports.

8. A milking machine claw as defined in claim 7 provided with a milk bleed passageway extending between each of said milk inlet ports and said milk discharge port.

9. A milking machine comprising: a valve chamber provided with four milk intake ports, a milk discharge port and an air bleed port; a closed milk container communicating with said milk discharge port; and a valve closure member disposed within said chamber for closing each of said milk intake ports and opening said air bleed port simultaneously and for alternately opening said milk intake ports and closing said air bleed port simultaneously, said valve closure member, thereby operating alternately to open or close said intake and discharge ports.

References Cited in the file of this patent

UNITED STATES PATENTS

| | | |
|---|---|---|
| 1,195,998 | Leitch | Aug. 29, 1916 |
| 1,354,666 | Lane | Oct. 5, 1920 |
| 1,959,581 | Hapgood | May 22, 1934 |
| 2,462,583 | Weiby | Feb. 22, 1949 |
| 2,744,496 | Roben | May 8, 1956 |

FOREIGN PATENTS

| | | |
|---|---|---|
| 79,130 | Netherlands | Sept. 15, 1955 |